United States Patent [15] 3,639,739
Golden et al. [45] Feb. 1, 1972

[54] DIGITAL LOW PASS FILTER

[72] Inventors: Roger M. Golden, Santa Monica; Stanley A. White, Yorba Linda, both of Calif.

[73] Assignee: North American Rockwell Corporation, El Segundo, Calif.

[22] Filed: Feb. 5, 1969

[21] Appl. No.: 796,679

[52] U.S. Cl. ....235/152, 235/183, 235/197, 328/167

[51] Int. Cl. ....G06f 15/34

[58] Field of Search ....235/152, 183, 197; 340/15.5, 340/15.5 DP, 15.5 CF, 15.5 AF; 307/229; 328/165, 167

[56] References Cited

UNITED STATES PATENTS

| | | | |
|---|---|---|---|
| 2,931,901 | 4/1960 | Markusen | 328/167 |
| 3,371,342 | 2/1968 | Carre | 328/165 |
| 3,411,093 | 11/1968 | Gaylor | 328/165 |

OTHER PUBLICATIONS

Weaver et al., " Digital Filtering With Applications To Electrocardiogram Processing," IEEE Trans. on Audio and Electroacoustics, Vol. Au-16, No. 3, Sept. 1968, pp. 350-359.
Transactions of the ASME, R. E. Kalman, March 1960, pp. 35-45.

*Primary Examiner*—Malcolm A. Morrison
*Assistant Examiner*—James F. Gottman
*Attorney*—William R. Lane, L. Lee Humphries and Rolf M. Pitts

[57] ABSTRACT

Means for low-pass filtering sampled digital data comprising a recirculating accumulator operated at a preselected sampling rate and having an output; and comparator means having a first sampling input coupled to an output of said accumulator and further having a second sampling input adapted to be connected to a digital signal to be filtered, an output of said comparator means being fed to an input of said accumulator, and the sampling rate of said first input of said comparator being substantially slower than that of said second input. The low relative sampling rate of the feedback arrangement serves to reduce the band-pass of the low-pass filter, while selective variation of such sampling rate correspondingly varies such band-pass.

9 Claims, 10 Drawing Figures

INVENTORS
STANLEY A. WHITE
ROGER M. GOLDEN
BY
[signature]
ATTORNEY

INVENTORS
STANLEY A. WHITE
ROGER M. GOLDEN
BY
[signature]
ATTORNEY

*INVENTORS*
STANLEY A. WHITE
ROGER M. GOLDEN
BY
[signature]
ATTORNEY

INVENTORS
STANLEY A. WHITE
ROGER M. GOLDEN
BY
ATTORNEY

INVENTORS
STANLEY A. WHITE
ROGER M. GOLDEN
BY
ATTORNEY

DIGITAL LOW-PASS FILTER

BACKGROUND OF THE INVENTION

The transfer functions of the servo controllers for many electromechanical-control systems include one or more low-frequency poles (e.g., lag terms). If the coefficients of a digital controller are not represented with sufficient accuracy, difficulties may be encountered when a continuous (analog) controller is replaced by a sampled data (i.e., digital) controller. Such coefficient accuracy in a digital-control system is especially important in preserving low-frequency pole positions in the transfer functions of sampled systems employing high sampling rates.

The mechanization of digital sampled data filters normally involves a trade off between accuracy and computing speed. High data rates are nominally inconsistent with large coefficient word size or high resolution. Therefore, the lowest frequency pole obtainable for a digital low-pass filter in a given digital computer has been limited by the coefficient word length resolution obtainable for the data rate employed. Sampled data filters require many bits of scaling coefficient arithmetic accuracy to realize a low-frequency pole, due to the slowly changing nature of the low-frequency data of interest.

The prior art in digital low-pass filter design is shown, for example, at pages 218–285 of the text "System Analysis by Digital Computer" by F. Kuo and J. Kaiser, published by John Wiley and Sons, New York, (1966) and in an article "Digital Filter Design Techniques in the Frequency Domain" at pages 149–171 in the Proceedings of IEEE, Vol. 55, No. 2, Feb. 1967.

SUMMARY OF THE INVENTION

By means of the concept of the subject invention, the above-noted limitations of the prior art are avoided and a satisfactory low-pass digital filter is provided, employing fewer bits and for which the band-pass may be conveniently adjusted.

In a preferred embodiment of the subject invention, there is provided means for low-pass digital filtering of sampled digital data and comprising a recirculating accumulator operated at a preselected sampling rate. There is also provided subtractor means having a first sampling rate. There is also provided subtractor means having a first sampling input coupled to an output of the accumulator and further having a second sampling input adapted to be connected to a digital signal to be filtered, an output of the subtractor means being fed to an input of the accumulator. The sampling rate of the subtractor first input is substantially slower than that of the second input.

In normal operation of the above-described arrangement, the slow sampling rate of the second or feedback input to the subtractor serves to provide a reduced averaged input corresponding to a reduced gain, the effect of which is to reduce the bandwidth of the low-pass filter effect obtainable with a given digital scaling coefficient word length and system data rate. By selectively varying the feedback sampling rate, the band-pass of the above-described low-pass filter arrangement may be conveniently varied. Accordingly, it is an object of the invention to provide an improved digital low-pass filter.

It is another object of the invention to provide a digital low-pass filter of reduced bandwidth.

It is still another object to provide means for conveniently varying the band-pass of a digital low-pass filter.

Still a further object is to provide a digital filter of limited coefficient word size and having increased utility.

These and further objects of the invention will become apparent from the following description, taken together with the accompanying drawings, in which:

DESCRIPTION OF THE PREFERRED EMBODIMENTS

Figure 1:
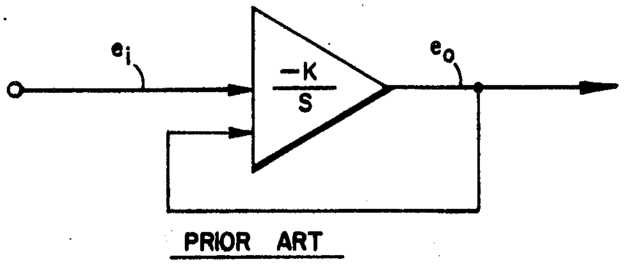
FIG. 1 is a block diagram of a prior art analog low-pass filter.

The general mode of operation of a digital low-pass filter may be appreciated from a consideration of a prior art closed loop analog integrator such as that illustrated in FIG. 1. Where the analog device is of the phase-inverting-type, the transfer function thereof may be written in Laplace notation as $-K/s$, where $K$ is a static gain term, $s$ is the Laplace operator, and the minus (−) sign indicates the phase-inversion property. By summing the phase inverted output of the integrator with the input thereto, a negative feedback-type of closed loop arrangement is provided, as shown in FIG. 1. The resulting transfer function, $e_o/e_i(s)$, may be determined as follows:

$$e_o/e_i(s)=(-K/s)/(1+K/s) \quad (1)$$

Rearranging:

$$e_o/e_i(s)=(-1)/(s/K+1)=(-1)/(\tau s+1) \quad (2)$$

where: $\tau=1/K$

Thus, the closed loop arrangement of the phase-inverting of FIG. 1 is seen to respond in the manner of a first order lag, the time constant of which varies inversely as the integrator gain. In other words, the break frequency or bandwidth of the low-pass filter of FIG. 1 varies as a direct function of the gain.

Digital filter characteristics are primarily determined by the accuracy in the specification of the coefficients in the terms of the filter transfer function. For a given sampling rate, the number of arithmetic bits used in mechanizing the multiplier coefficient of a digital filter section limits the lowest frequency pole that can be mechanized by such filter section, while increasing the sampling rate increases the frequency of such lowest frequency pole. As the number of arithmetic bits used to mechanize the filter is reduced, the control of the filter pole location is degraded. In the case of band-pass filters, prolonged ringing results in response to a transient or disturbance input.

In the mechanization of a low-pass digital filter or low-frequency poles of a sampled data system by means of a closed loop integrator, the coefficient-accuracy problem occurs in the proper gain-setting or scaling of the outer feedback loop because such gain coefficient is normally such a very small number, (relative to unity). However, by means of the concept of the invention either a zero-order hold function or a multirate sampler may be employed, which make possible a desired coefficient accuracy with a smaller word size.

The signal appearing at the output of an integrator has a much smaller high-frequency component than the signal input applied thereto, due to the high-frequency signal-attenuation property of an integrator, as is well understood in the art. Therefore, the output of the integrator may be sampled at a lower rate than an applied input without substantial aliasing or foldover distortion of the output data. Now, a desired gain in an outer feedback loop of a digital filter employing such integrator, may be provided by reducing the feedback-sampling rate (relative to the system input sampling rate) and compensatorily increasing or scaling up the feedback signal, to maintain a preselected (time-averaged) feedback gain. By so scaling up the gain of the feedback signal, the required number of bits for mechanization may be correspondingly reduced without affecting data resolution. For most control system applications, a coefficient scaling word length of eight data bits (plus a sign bit) seems to be adequate.

Figure 2:
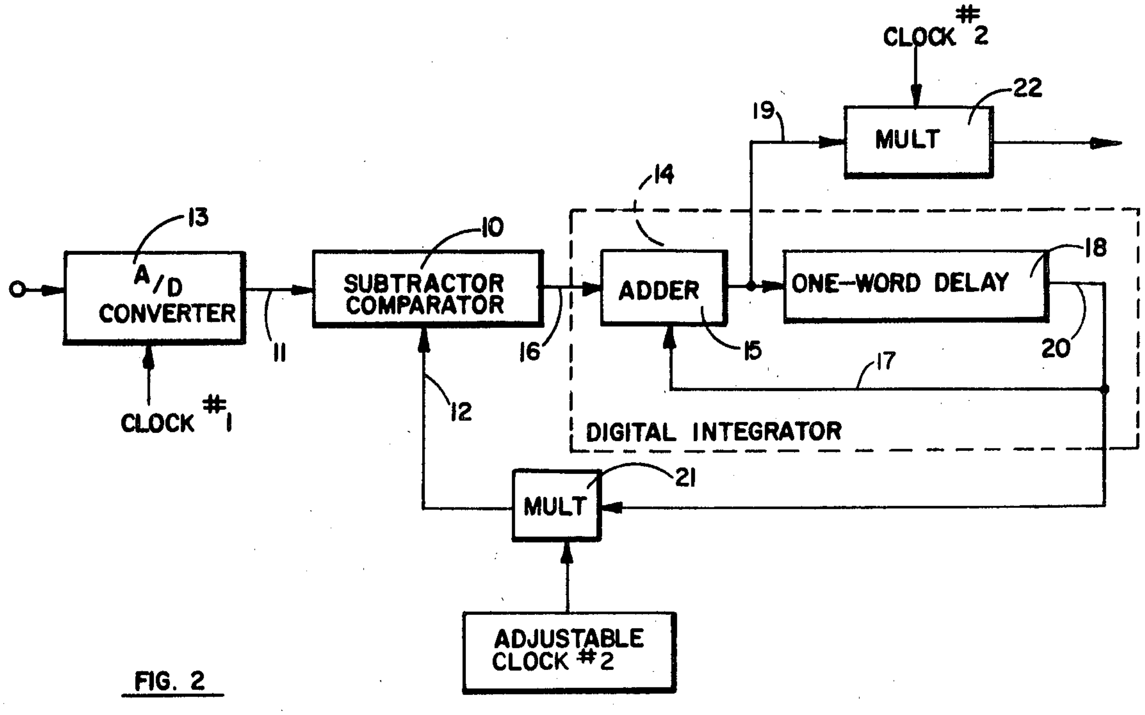
FIG. 2 is a block diagram of a digital system embodying the concept of the invention.

A digital low-pass filter for sampled data systems and embodying the inventive concept, is shown in FIG. 2. Included in such arrangement is subtractor means 10 having a first and second sampled input 11 and 12, the sampling rate of the second input being substantially less than that of the first input. The sampling for the first input may be provided by an analog-to-digital converter 13, where the signal to be filtered is in analog form. There is also provided an accumulator such as recirculating register means or digital integrator 14 comprising an adder 15 having a first input 16 responsively coupled to an output of subtractor 10 and further having a second input 17. A delay element 18, such as, for example, a shift register having an input coupled to an output 19 of adder 15, has an output 20 which is fed to a second input 17 of adder 15 and to second input 12 of subtractor means 10 through a multiplier 21.

In normal operation of the above described arrangement, the application of a sampled digital input signal at input 11 of comparator 10 results in a low-pass filtered digital output on output 19 of adder 15. Element 14 of FIG. 2 corresponds to analog integrator of FIG. 1. That elements 15 and 18 cooperate as a digital integrator may be appreciated from the fact that adder 15 provides an output on line 19 corresponding to the sum of an applied input ($\Delta a(t_n)$) on line 16 and the sum of previously applied inputs thereto, as stored or delayed in element 18. In other words, the output $a_N$ on line 19 is:

$$a_N = \sum_{n=0}^{n=N} \Delta a(t_n), \quad (3)$$

which is analogous to analog integration:

$$a(T) = \int_{t=0}^{t=T} a dt, \quad (4)$$

whereby the negative feedback cooperation of subtractor 10 and digital integrator 14 are seen to cooperate as a low-pass digital filter, corresponding to the analog low-pass filter arrangement of FIG. 1. Where it is desired to effect a gain or scaling of the digital integrator 14 of FIG. 2 such gain term may be provided by a multiplier interposed between the output of subtractor 10 and input 16 of adder 15. In order for the dynamics of the filter of FIG. 2 to be comparable to the dynamics of the filter of FIG. 1, the multiplier coefficient of the filter of FIG. 2 is usually set at $1-e^{-KT}$ where $K$ is the gain shown in FIG. 1, $T$ is the interval between data words into the filter of FIG. 2, and $e$ is base of the natural number system $$e = \lim_{x\to\infty}\left(1+\frac{1}{x}\right)x.$$

Of course, in the case of a very low-pass filter having a break frequency ($\omega_{co}=1/\tau$) of less than 1 radian per second is desired, then magnitude of the gain is correspondingly less than unity. Where, however, it is desirable or more convenient to include such gain provision in the feedback input 12 of subtractor 10, then compensatory scaling ($K_1$) is also required at the filtered output 19 of integrator 14. In terms of the functionally analogous arrangement of FIG. 1:

$$x(s)=(1/s)/(1+K/s)=(1/K)/(s/K+1)=(1/K)/(\tau s+1) \quad (5)$$

$$x'(s)=K_1x(s)=(K_1/K)/(\tau s+1)=(1)/(\tau s+1) \quad (6)$$

where:

$x'(s)$ = gain-compensated filter transfer function and $K_1=K$

Thus, the break frequency or band-pass of the low-pass digital filter of FIG. 2 may be varied by varying the gain of the feedback path 12, while the gain scaling at output 19 must be similarly varied to preserve a preselected output signal scale, even though a unity gain accumulator is used in the digital integrator 14.

Such scaling means may be provided by a first and second multiplier 21 and 22, the first responsive to a clock source for effecting gainscaling of a respective applied signal in response to a suitable clock time or sample time $kT$, where $k=1$. Now, rather than multiply the feedback signal on line 20 by the preselected gain factor each word time of the sampled data system of FIG. 2, multiplier 21 may be operated every ith word time to multiply the output on line 20 by $i$-times the selected gain factor, multiplying such output by zero during other word times. In this way, the time-averaged gain effect is still the same to signal components the spectral content of which is substantially below both such lesser sampling frequency and the system sampling rate. In other words, the low-frequency data response is unaffected.

By changing the submultiple sampling rate of multiplier 21 to other submultiples of the system data rate, the averaged gain effect of multiplier 21 is directly changed, thereby effecting a change in the break frequency or band-pass of the low-pass filter; while similarly changing the sampling rate of multiplier 22 compensates for the associated gain change produced by the sampling change of multiplier 21. In other words, multipliers 21 and 22 may be operated synchronously for conveniently varying the filter bandwidth without affecting the filter gain.

Another advantage of the low-pass filter arrangement of FIG. 2 is that its accuracy is not seriously degraded as the number of bits in the arithmetic is reduced, as compared to prior art approaches.

Figure 3:
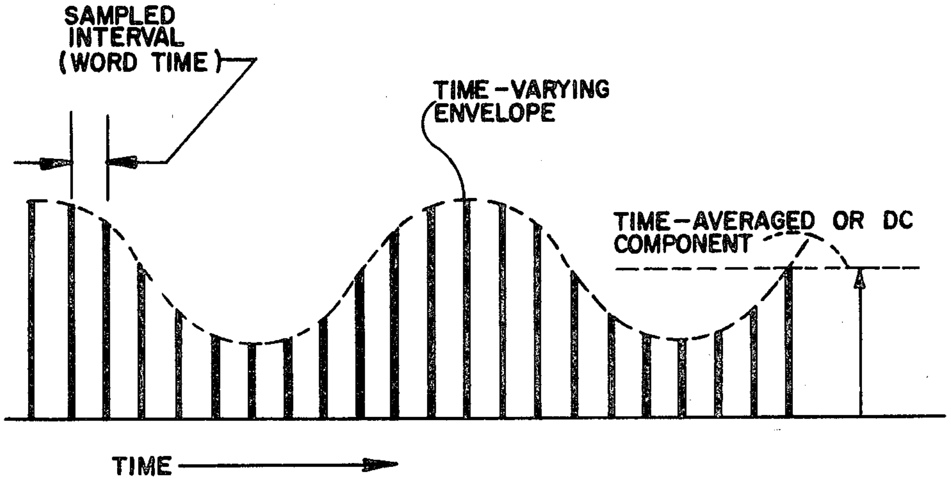
FIG. 3 is a representation of a sampled data format.
Figure 4:
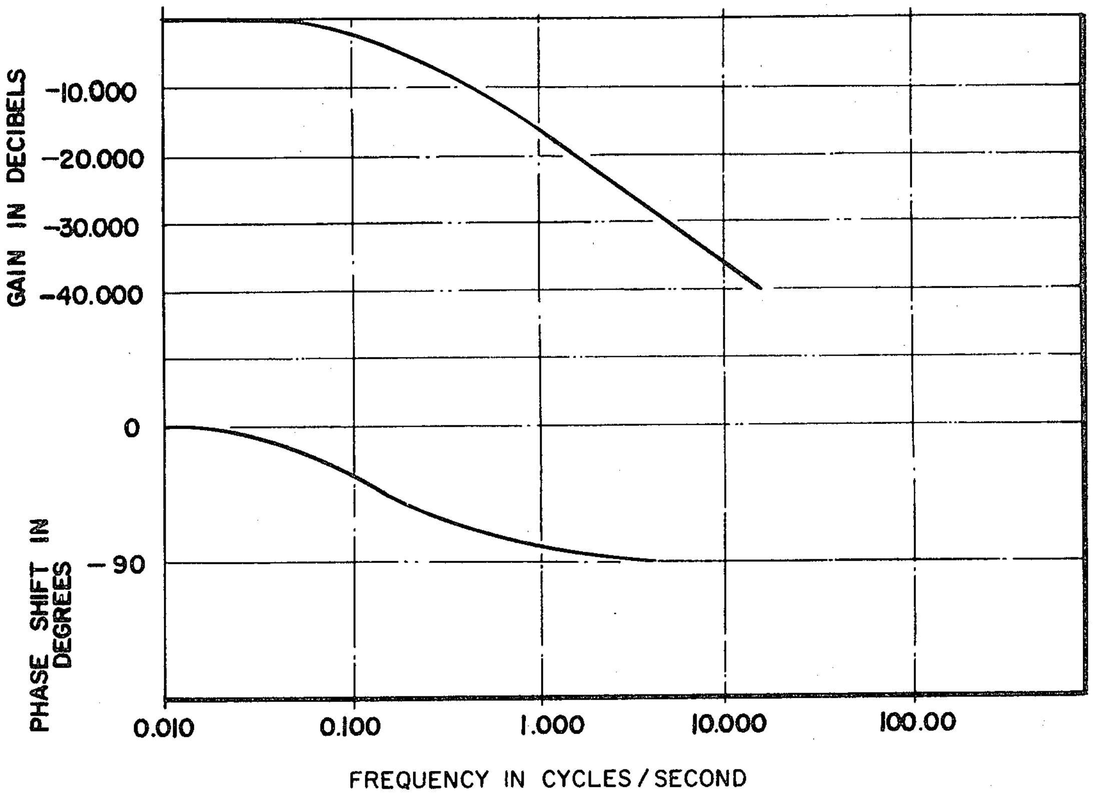
FIG. 4 is a diagram illustrating an exemplary frequency response obtained by means of the arrangement of FIG. 2; i.e., ideal response.

In normal operation of the sampled data filter FIG. 2, the applied input on line 11 may resemble the exemplary response shown in FIG. 3, being a sampled data signal the spectral content of which may include a DC average or low-frequency component and a high-frequency time-varying component, the frequency of which is normally less than that of the data sample rate, and which data content is represented by the envelope of the sampled data. The magnitude of each data sample would, in a digital system, be represented by a digital word corresponding to the analog representation in FIG. 3.

Where an eight-bit arithmetic is used, and for a 1.6-kc.-system work sampling ($1/T$) and a gain ($1-e^{-KT}\cong KT$) of 1/1,600, the representative frequency response resembles that illustrated in FIG. 4, corresponding to a first order lag or pole having a break frequency or root at 0.16 cycles/second (or 1 radian/second), which favorably compare with a theoretical minimum based on the prior art of $1/7\times2^{-8}=1.67$ radians/second.

Figure 5:
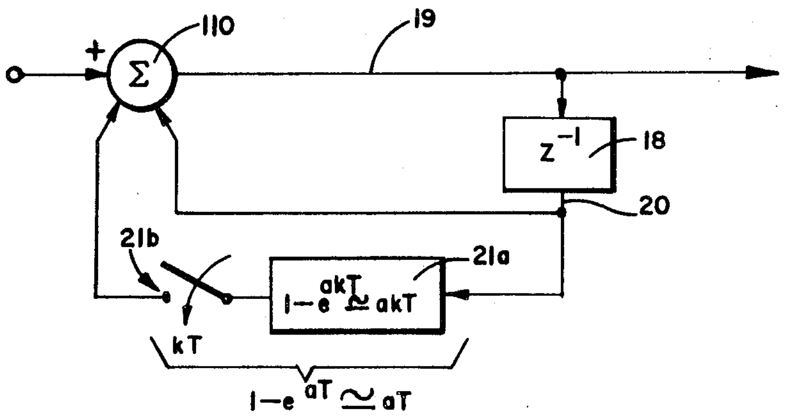
FIG. 5 is an alternate representation of the device of FIG. 2, employing Z transform notation.

The block diagram of FIG. 2 may be further abbreviated in representation as shown in FIG. 5, by representing arithmetic elements 10 and 15 (of FIG. 2) as a single signal combining means 110, and by using Z-transform notation, $Z^{-1}$, to designate block 18 as a single-word delay. Multiplier 21 (of FIG. 2) is alternatively represented in FIG. 5 as digital gain scaling means 21$a$ followed by a reduced-rate sampling device 21$b$.

Figure 6:
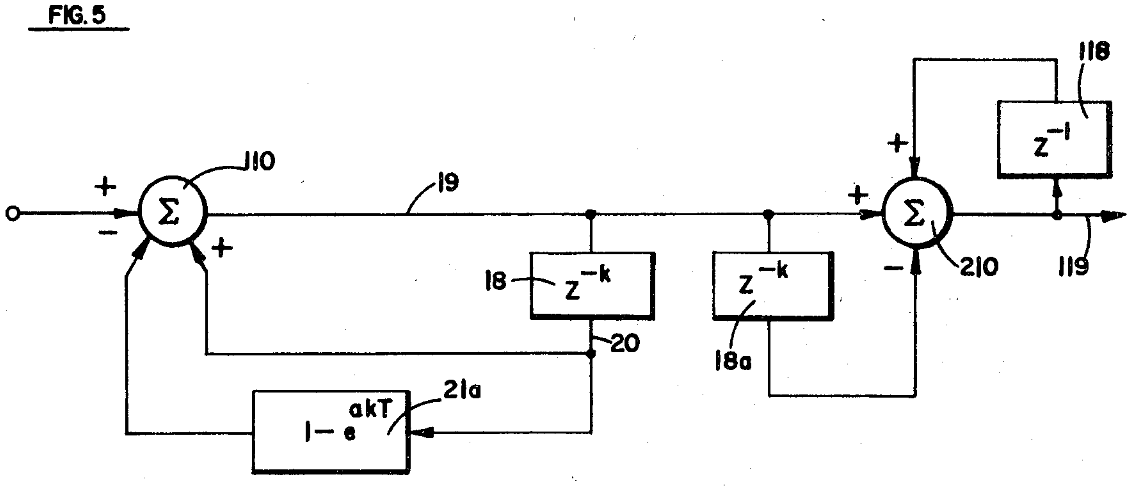
FIGS. 6 and 7 are alternate embodiments of a first order low-pass filter.
Figure 7:
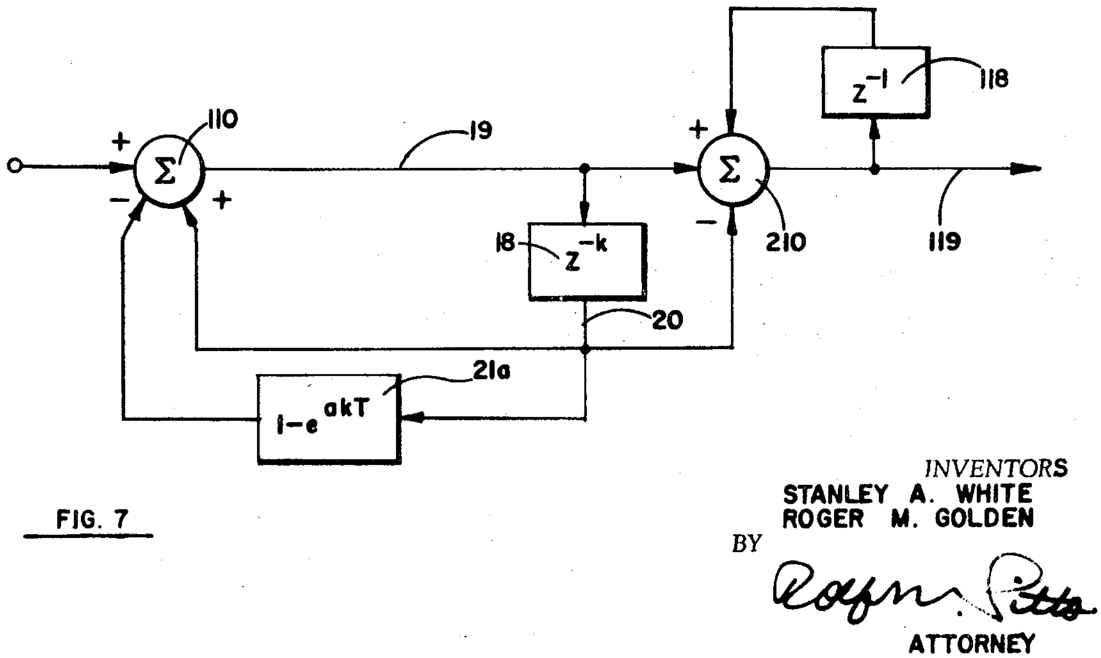
Figure 10:
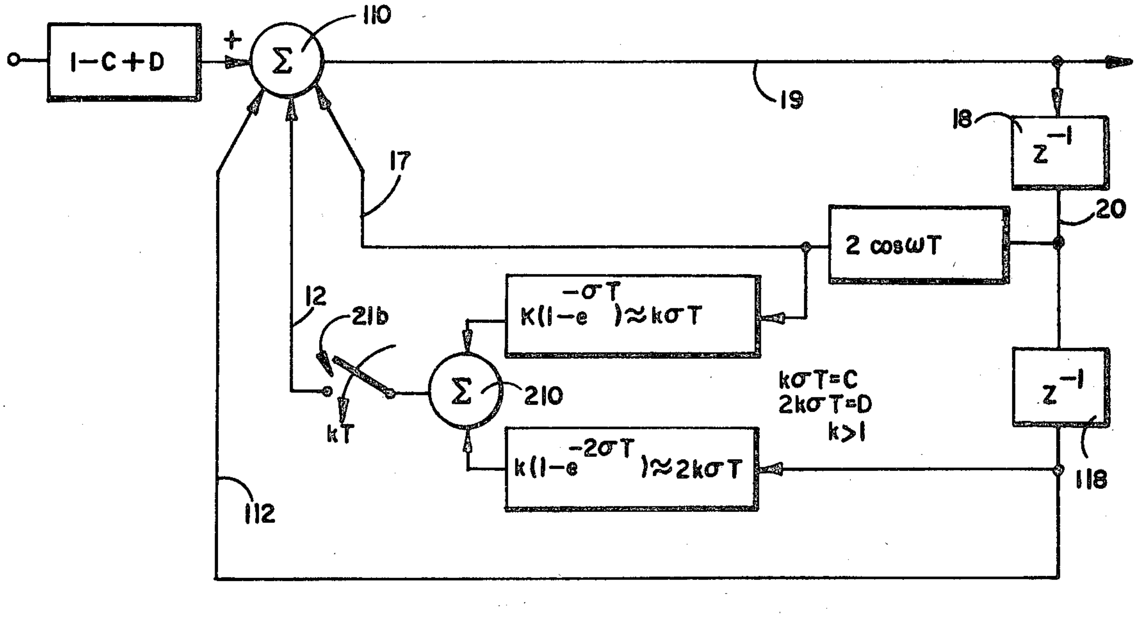
FIG. 10 is a block diagram of a second order lightly damped digital filter, embodying the inventive concept.

The common low-pass filter arrangement of FIGS. 2 and 5 is an approximate device in performance, a certain granularity or irregularity appearing in the gain-versus-frequency response, which response characteristic may be overcome, if desired, by an alternate embodiment employing a multiword delay for element 18 and the inclusion of additional equipment, as shown in FIGS. 6 and 7. In such alternate arrangement, the multiple word delay (of element 18) obviates the need of the reduced sampling rate element 21$b$ of FIG. 3. However, a larger shift register must be employed for $Z^{-k}$ (in FIG. 4) than for $Z^{-1}$ (in FIG. 5). Also, the associated amplitude-versus-frequency response occurring on line 19 (in FIG. 6) is only an approximate first order lag, more accurately representing a first order lag (at the desired break frequency, $a$) and a first order lead (at $1/4kT$, where $kT$ is the multiple word delay time), and a series of spectral "spikes" occurring at spectral intervals of $1/kT$ in the frequency domain, as shown more particularly by the solid curve 23 in FIG. 8. Such first order lead effect, or zero, and the series of spikes may be attenuated by a compensatory network formed, in FIG. 6, by the illustrated cooperation of the elements 18a, 118 and 210. The recirculating arrangement of single-word delay ($Z^{-1}$) element 118 with combining means 210 comprises a digital integrator (analogous to the analog form 1/*s* in Laplace notation), while the comparison of the output or multiple word-delay ($Z^{-k}$) element 18a with the signal on line 19 by combining means 210 functions as a differentiator (analogous to the form *s*, in Laplace notation) coupled with a break frequency at $1/4kT$ and amplitude spikes complimentary to those of curve 23. Such combined effect of elements 18a, 118 and 210 is shown as dotted curve 24 in FIG. 8. The net or resultant frequency response output on line 119 in FIG. 6 is the logarithmic sum of the amplitude responses of curves 23 and 24, shown as curve 25 in FIG. 10, which combined response is free of both granularity and spikes. Such arrangement of FIG. 6 may be simplified by using the output of multiple word-delay element 18 to feed both combining means 110 and 210, obviating the need of element 18a as shown in FIG. 7.

Figure 8:
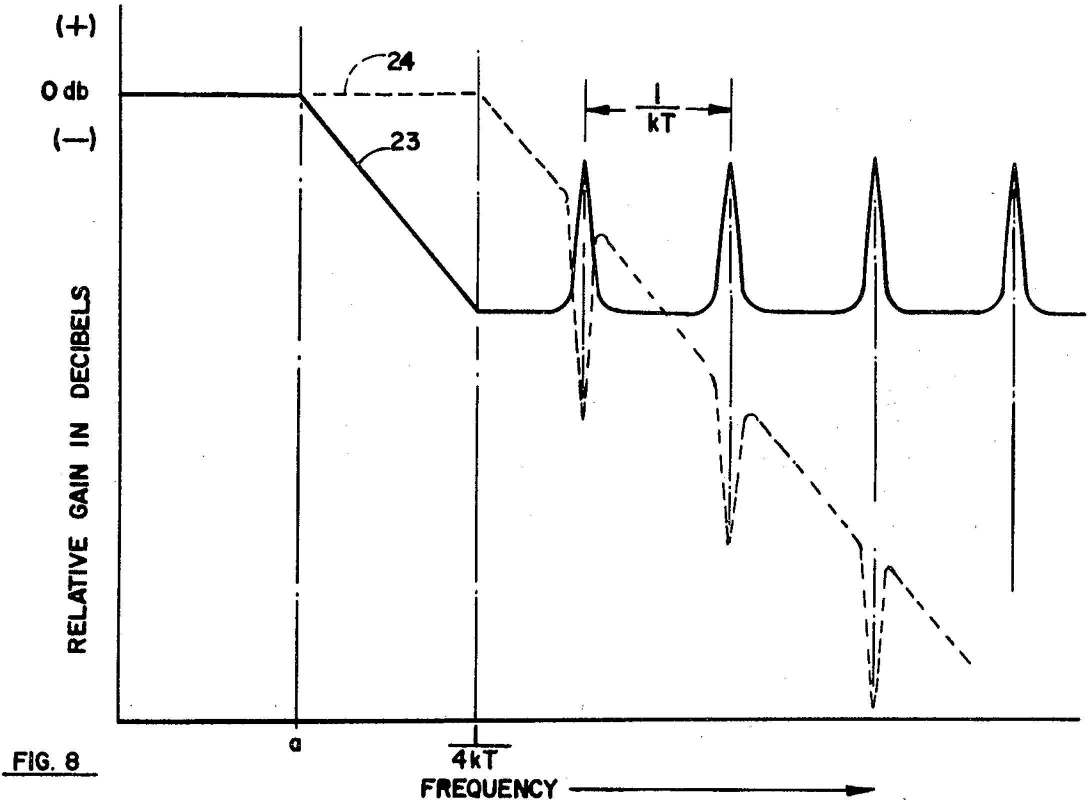
FIGS. 8 and 9 are representative frequency responses of the device FIG. 6.
Figure 9:
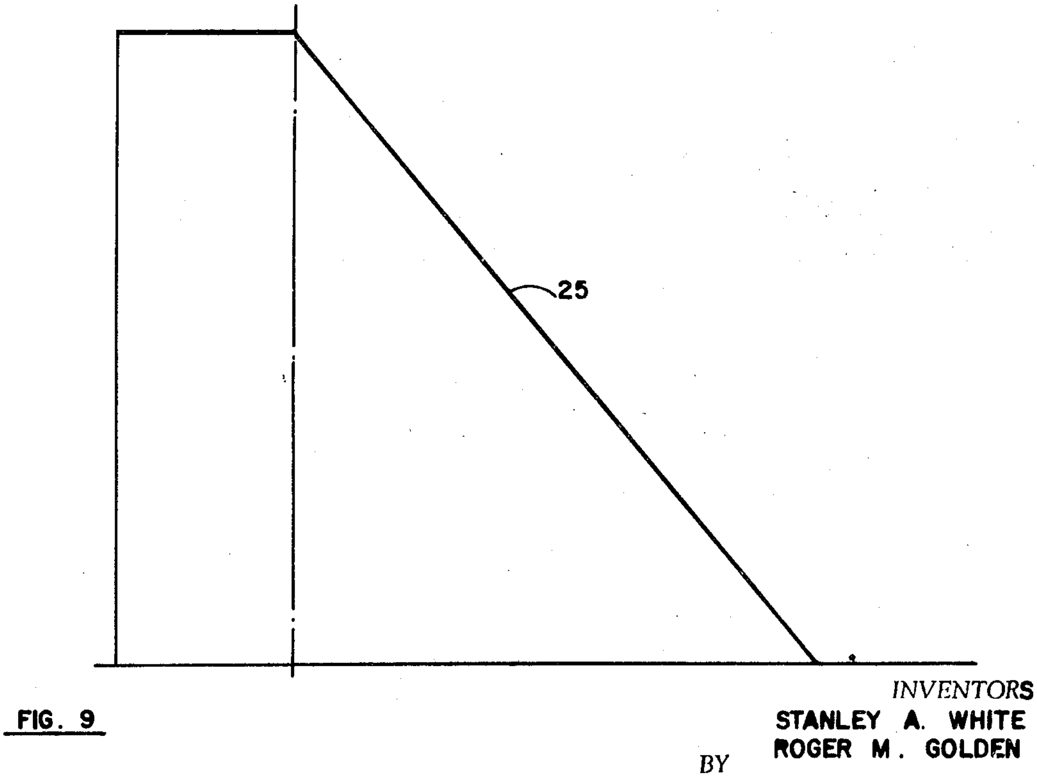

It is to be appreciated that a repeated pole, or root of any order, may be obtained by the cascading of a corresponding number of like first order digital low-pass filters. Although a multiple word length holding technique has been described for reducing the number of arithmetic bits in a digital low-pass filter corresponding to a first order lag ($1/Ts+1$), the concept of the invention is not so limited and is equally applicable to the mechanization of other transfer functions, such as selectively damped second order systems described by a pair of complex conjugate poles. An exemplary second order low-pass digital filter, embodying such multiple word-holding technique (by means of reduced sampling rate means 21b) is shown in FIG. 8.

Hence, it is to be appreciated that an improved digital low-pass filter has been described, which filter may be effectively employed with fewer bits of arithmetic and the band-pass of which may be conveniently adjusted by adjustment of the filter sample rate.

Although the invention has been described and illustrated in detail, is is to be clearly understood that the same is by way of illustration and example only and is not to be taken by way of limitation, the spirit and scope of this invention being limited only by the terms of the appended claims.

I claim:

1. In a sampled data systems having a preselected system sampling interval (*T*), means for adjustably low-pass filtering sampled data comprising
   - a recirculating accumulator operated at a preselected word-delay;
   - comparator means having a first sampling input coupled to an output of said accumulator and further having a second sampling input adapted to be coupled to a source of a digital signal to be filtered, an output of said comparator means being fed to an input of said accumulator, and
   - a preselected one of the sampling interval of said first input of said comparator and the delay of said accumulator being selectively adjustable integer multiple (*k*) of said system sampling interval (*T*).

2. The device of claim 1 in which said accumulator comprises a multiword time delay (*kT*) element, and in which there is further provided signal-combining means responsively coupled to said output of said accumulator,
   - a like second multiword delay element responsively coupled to said output of said accumulator and cooperating with said signal-combining means as a digital differentiator;
   - a single-word delay element input coupled to an output of said signal combining means and further cooperating therewith as a second recirculating accumulator, an output of said second recirculating accumulator representing a low-pass filtered output of interest.

3. The device of claim 1 in which said accumulator comprises a multiword time delay (*kT*) element and in which there is further provided
   - signal-combining means responsively coupled to a second output of said accumulator and cooperating therewith as a digital differentiator;
   - a single-word delay element input coupled to an output of said signal-combining means and further cooperating therewith as a second recirculating accumulator, an output of said second recirculating accumulator representing a low-pass filtered output of interest.

4. In a digital sample data system, low-pass digital filter means comprising
   - a recirculating accumulator having an output; and
   - comparator means having a first input of adjustable sampling rate and responsive to said output of said accumulator and further having a second input adapted to be responsive to a sampled digital signal, an input of said accumulator being responsive to an output of said comparison means.

5. Means for adjustable low-pass filtering sampled digital data comprising
   - a recirculating accumulator operated at a preselected sampling rate and having an output; and
   - comparator means having a first sampling input coupled to an output of said accumulator and further having a second sampling input adapted to be connected to a source of a digital signal to be filtered, an output of said comparator means being fed to an input of said accumulator, and the sampling rate of said second input of said comparator being selectively adjustable substantially slower than that of said first input.

6. The device of claim 5 in which the sampling rates of said accumulator and said first input of said comparator means are mutually synchronous.

7. The device of claim 5 in which there is further provided means for adjusting the sampling rate of said second input of said comparator, whereby the low-pass bandwidth of said means for filtering is varied.

8. In a digital sampled data system, low-pass digital filter means comprising
   - comparator means having a first and second sampled input, the sampling rate of said second input being selectively adjustable and substantially less than that of said first input;
   - an adder having a first input responsively coupled to an output of said comparator means and further having a second input;
   - a delay means having an input coupled to an output of said adder and having an output fed to a respective second input of each of said comparator and adder.

9. The device of claim 8 in which there is further provided means operated in synchronism with said selectively adjustable sampling rate and coupled to said output of said adder for providing a low-pass filtered output having a gain compensatorily adjusted for changes in said adjustable sampling rate.

* * * * *